June 11, 1968 C. B. LABS Re. 26,408
CONTAINER ASSEMBLY FOR AGING WHISKEY
Original Filed June 5, 1964
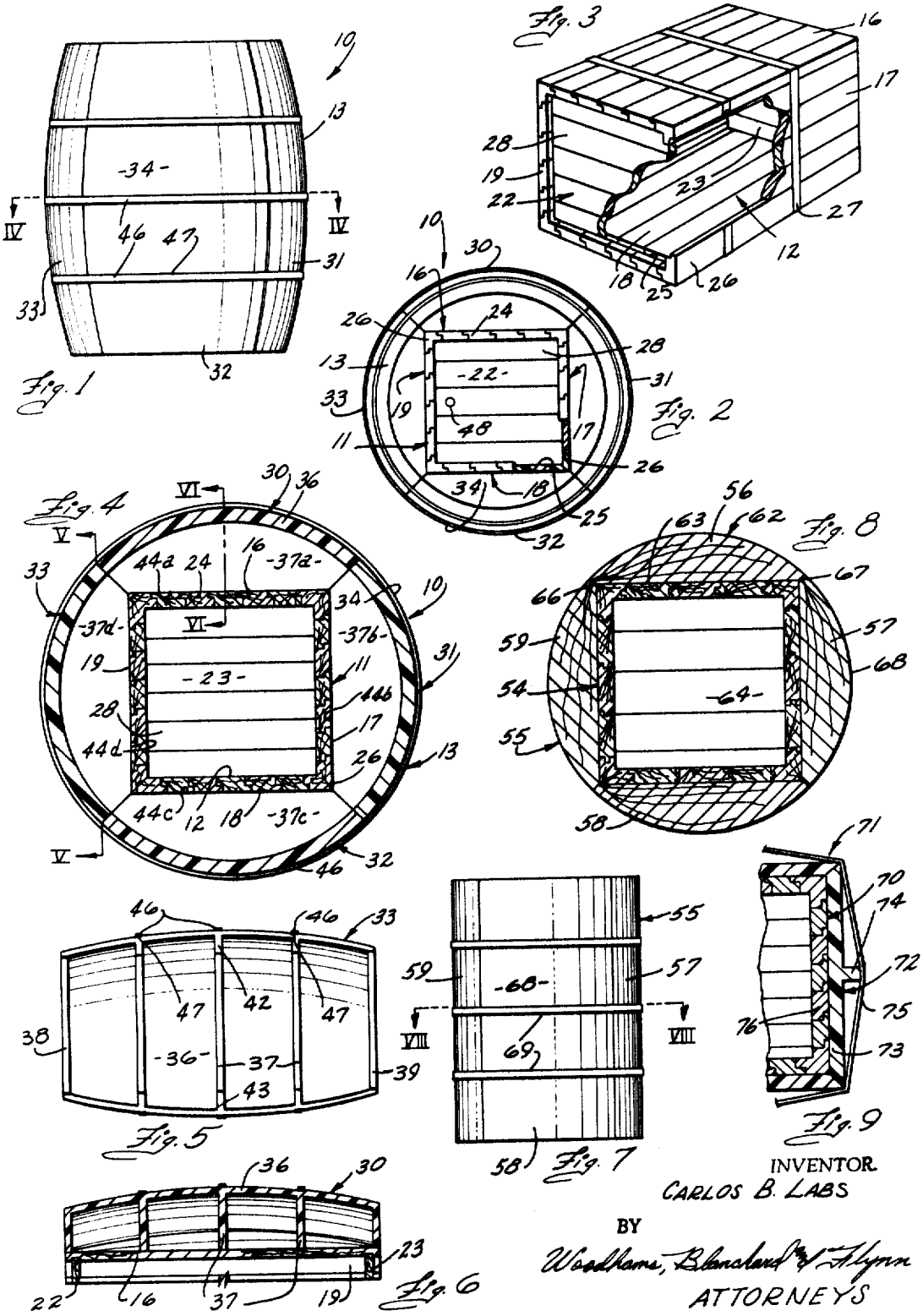
INVENTOR.
CARLOS B. LABS
BY
Woodhams, Blanchard & Flynn
ATTORNEYS United States Patent Office Re. 26,408
Reissued June 11, 1968

26,408

CONTAINER ASSEMBLY FOR AGING WHISKEY

Carlos B. Labs, 527 S. Westnedge,
Kalamazoo, Mich. 49007

Original No. 3,259,055, dated July 5, 1966, Ser. No. 372,786, June 5, 1964. Application for reissue Apr. 24, 1967, Ser. No. 641,722
5 Claims. (Cl. 99—277.1)

Matter enclosed in heavy brackets [ ] appears in the original patent but forms no part of this reissue specification; matter printed in italics indicates the additions made by reissue.

*ABSTRACT OF THE DISCLOSURE*

*A rectangular container having side walls and end walls formed from elongated, flat strips of wood having water-tight joint means therebetween. The side walls are held against the end walls by side members which are engaged by annular bands encircling the container.*

This invention relates in general to a container construction and to a method of assembling and holding together a wooden container so that it can be used for aging whiskey or the like and thereafter disassembled quickly and easily so that the parts of the container can be refinished and reused for another purpose.

Persons familiar with the manufacture, sale and use of barrels used for holding certain type of liquids, and particularly the oak barrels used for aging whiskey, have long been keenly aware of the loss suffered by distilleries when the used barrel or cask must be thrown away because, according to the law, it cannot be reused for aging whiskey and, because of its shape, neither it nor its parts have any other known utility of a comparable value. Each aging barrel is made from high grade white oak which is still sound and has years of useful life after it has completed its service in an aging barrel. Many years ago, and earlier, when labor and material costs were relatively small, the waste created by the destruction of the barrels following one use thereof, could be ignored. However, in recent years, the cost of the aging barrels has increased to the point where the loss of these barrels has become significant in the cost of operating the distillery.

While reference is made to the reuse of the wood from the cask or container embodying the invention for flooring, it will be recognized that the wood in applicant's container may be capable of other uses. Moreover, it will be recognized that parts of the container construction, which do not engage the liquid, may be formed from materials other than wood.

Accordingly, a primary object of this invention has been the provision of a rectangular, wooden container capable of use as an aging cask for whiskey, and associated structure for releasably holding the wood of the container in a liquid tight condition, during its use for aging whiskey, and thereafter capable of being easily disassembled without any injury to the wood in the container so that said wood can be refinished for further valuable use.

A further object of this invention has been the provision of method for preparing the wood and assembling the container so that it can be used to provide a liquid tight chamber and thereafter easily disassembled so that the wood of the container can be reused.

A further object of this invention is the provision of an assembly including the aforesaid rectangular container and a plurality of side members which not only hold the container in position, but also provide a barrel-shaped outer surface of circular cross section which provides the container with the same facility of movement as a conventional barrel, and in which the side members can be reused [may] *many* times because they have no contact with the contents of the container.

A further object of this invention is the provision of an oak container, as aforesaid, which is made so that virtually all parts thereof can be reused economically and beneficially after they have served their purpose as part of the aging container.

A further object of this invention is the provision of a container construction, as aforesaid, which is capable of manufacture as a cost not materially greater than the cost of existing structures for the same or similar purposes and which, by virtue of its capacity for further use after its use for aging whiskey, is much less costly than existing containers for the same or similar purposes.

Other objects and purposes of this invention will become apparent to persons familiar with this type of equipment upon reading the following specification and examining the drawings, in which:

FIGURE 1 is a side elevational view of a container assembly embodying the invention.

FIGURE 2 is a broken, end elevation of said container assembly embodying the invention.

FIGURE 3 is a broken, perspective view of a rectangular container comprising the fluid holding part of the container assembly.

FIGURE 4 is a sectional view taken along the line IV—IV in FIGURE 1.

FIGURE 5 is a sectional view taken along the line V—V in FIGURE 4.

FIGURE 6 is a sectional view taken along the line VI—VI in FIGURE 4.

FIGURE 7 is a side elevational view of a modified container assembly embodying the invention.

FIGURE 8 is a sectional view taken along the line VIII—VIII in FIGURE 7.

FIGURE 9 is a fragment of a transverse sectional view of another modified container construction.

For the purpose of convenience in description, the words "inner," "outer" and derivatives thereof will have reference to the geometric center of the container assembly and parts thereof embodying the invention.

GENERAL CONSTRUCTION

The objects and purposes of the invention, including those set forth above, have been met by providing a rectangular wooden container fabricated from wooden elements or strips, such as white oak, which are arranged so that the six walls thereof can be held together in a preliminary fashion by means of annular bands. Some form of joint is preferably provided between each adjacent element in the container, and the elements are held together by annular bands.

The side walls of the container are also held against the two end walls and with respect to each other by four similar side members which respectively engage the four sides of the container. When the side members are in their container engaging positions, their outer surfaces substantially define the external shape of a barrel. A plurality of annular bands are then placed around the outer surfaces of the side members to hold them with respect to each other and tightly against the container whereby a sturdy, barrel-shaped construction is provided. The inner surfaces of the wooden strips from which the end walls and side walls are formed, are charred so that they can serve their proper function during the aging operation.

When the container has served its purposes as an aging container, the outer bands are removed so that the side members can be removed, and the inner bands are removed so that the container can be disassembled. The wooden strips used in the container are then resurfaced by a suitable machine, whereupon the wood is ready for reuse.

DETAILED DESCRIPTION

This application is intended to disclose a method for making and assembling a wooden container so that the liquid engaging parts thereof can be used for other purposes, after the aging operation has been performed. The application is also intended to disclose a structure whereby the method can be practiced. However, it is believed that the method can best be disclosed by describing the apparatus used to practice the method.

The container assembly or barrel 10 (FIGURES 1, 2 and 4), which has been selected to illustrate one embodiment of the invention, is comprised of a container or inner shell 11, defining a rectangular, totally enclosed and elongated chamber 12, and an outer shell 13 having a circular cross section. As shown in FIGURES 3 and 4, the inner shell 11 has four elongated side walls 16, 17, 18 and 19 which are preferably of the same size and rectangular shape. The inner shell 11 also has a pair of preferably square end walls 22 and 23, the edges of which are received into grooves in said side walls, such as the groove 25 in the side wall 18 (FIGURES 2 and 3).

Each side wall, such as the side wall 18 (FIGURE 3), is comprised of a plurality of elongated, wooden side elements or boards 24 and a pair of wooden corner elements 26, which are preferably L-shaped in cross section. Thus, each corner element 26 becomes part of its two adjacent side walls. In this particular embodiment, the elements 24 and 26 are preferably of the same length and the lengthwise edges thereof are rabbitted to provide a lapped joint between adjacent elements. However, as shown in FIGURE 8, other types of joints, including a tongue and groove joint, may be used. Each end wall 22 and 23 is comprised of a plurality of wooden elements 28 similar to, but shorter than, the elements 24.

Containers, such as barrels, used for aging whiskey are traditionally made from high grade, white oak which is charred on the surfaces thereof that are engaged by the whiskey. However, other types of wood may be suitable for this use and, therefore, the specific reference to white oak herein is not intended to limit the invention to white oak. The side elements 24 and corner elements 26 are intentionally fabricated with thicknesses which permit refinishing thereof to provide a useful thickness after the elements have served their purpose as part of an aging container or cask 11. That is, if the elements 24 are to be used as three-quarter inch flooring, for example, after they have been refinished, then it is necessary to preselect a thickness in said elements which will permit removal of the char on one surface and finishing on both surfaces to produce a finished board which is three quarters of an inch in thickness.

When the side walls and end walls have been placed in their assembled condition, as shown in FIGURE 3, they are tightly held together by straps or bands 27, preferably without the use of connecting means, such as an adhesive, between adjacent elements or walls. The bands 27, which may be made from metal, resin impregnated fiber glass or the like, will not be expected to hold all of the side elements in liquid tight condition, due to the rectangular cross section of the inner shell. That is, the bands 27 will not normally be capable of preventing some movement of the joints between the side elements 24 near the center of each side wall during movement of the container 11, and such movement could result in leaking. However, the outer shell 13 provides the necessary rigidity.

The outer shell 13 (FIGURES 2 and 4) is comprised in this particular embodiment of four shell segments 30, 31, 32 and 33 which are preferably identical and which, when placed together around the inner shell 11, define a barrel-shaped outer surface 34. The shell segment 33, for example (FIGURE 5), has a radial wall 36 which is curved both lengthwise and transversely to provide part of the convex outer surface 34, hence, part of the outer shell 13. The segment 33 also has a plurality of vanes 37 between the lengthwise ends of the segment which extend radially inwardly. A pair of end vanes 38 and 39 also extend radially inwardly from the radial wall 36, and the radially inner edges of the vanes 37, 38 and 39 preferably lie in a single plane. The vanes 37 have end portions 42 and 43 which are disposed at 45° angles to their radially inner edges 44 to facilitate their engagement with corresponding end portions on the vanes of the adjacent segments. Accordingly, the vanes 37a, 37b, 37c and 37d (FIGURE 4) on the segments 30, 31, 32 and 33, respectively, define a plane perpendicular to the lengthwise extent of the outer shell 13, and their respective inner edges 44a, 44b, 44c and 44d snugly engage the outer surfaces of the side walls 16, 17, 18 and 19, respectively, throughout their widths. Thus, when said segments are held tightly against the side walls of the inner shell 11, as shown in FIGURES 2 and 4, said side walls are in turn held tightly against the edges of the end walls 22 and 23 and, therefore, in a substantially leakproof condition.

The segments 30, 31, 32 and 33 are held in their FIGURE 2 positions by means of a plurality of bands or straps 46 which are wrapped tightly around the external surface of the outer shell 13, formed by said shell segments. As shown in FIGURES 5 and 6, the outer surface 34 of the outer shell 13 may be provided with cylindrical portions 47 into which the two outside bands 46 are received in order to prevent inadvertent axial movement of said bands off the small ends of the barrel. A slight recessing of the cylindrical portions 47 may be desirable.

Under normal circumstances, the inner surfaces of the elements 24 and 26 will be completely charred before the assembly of the barrel is completed. It will be recognized that such charring can be done on an element by element basis or on a side wall and end wall basis, depending upon the type of assembly procedures which are used. At some time during the fabrication of the barrel 10, the end wall 22, for example, may be provided with a bung hole or opening 48 through which the cask 11 may be filled and emptied.

The segments 30, 31, 32 and 33 of the outer shell 13 may be fabricated from any suitable, rigid material such as wood, light weight metal or plastic. Normally, said shell segments will be fabricated slightly undersize so that a snug engagement with the outside walls of the cask 11 is assured even though there may be a slight space between the adjacent edges of adjacent shell segments. Moreover, such undersize construction also permits tightening of the outer shell 13, thereby permitting tightening of the cask to prevent leakage in the event that the cask 11 should shrink somewhat prior to its use in the aging process.

In an alternate construction (FIGURES 7 and 8) the container or inner shell [55] *54* may be substantially identical with the container 11 shown in FIGURE 3. However, the outer shell 55 is comprised of four solid and preferably identical segments 56, 57, 58 and 59. The segment 56, for example, has an outer surface 62 which preferably defines one-quarter of a cylinder. The segment 56, like the other segments, also has a planar inner surface 63 which is about equal in area and width to the area and width of the adjacent side wall 64 of the inner shell 54.

The segment 56, like the other segments, has a pair of side edges 66 and 67 which are preferably beveled at 45° to the plane of the inner surface 63 so that the four segments can be snugly arranged around the inner shell 54 to define a cylindrical outer surface 68 (FIGURE 7). The segments are held in this cylindrical arrangement by a plurality of bands or straps 69 which may be fabricated from metal, resin impregnated fiber glass or the like.

FIGURE 9 illustrates a modified container assembly 71 having an outer shell 72 defined by four, substantially flat side walls 73 which are substantially identical. Each side wall 73 has a lengthwise and centrally located rib 74 which projects outwardly from the side wall. Accordingly, when the bands 75 are tightened around the outer shell 72, they form with the rib 74 a truss whereby the central portion of the outer shell 72 is urged against the adjacent side wall 76 of the inner shell 70. The container assembly 71 may be advantageous where minimum space requirements are desired and where the rollability of the container assembly is of no consequence.

ASSEMBLY

Under normal circumstances, the elements 24 and 26 of the side walls 16, 17, 18 and 19, as well as the elements 28 of the end walls 22 and 23, will be precut to size and shape before charring. In one form of the invention, the side elements 24 for a plurality of containers 11 will be placed in side-by-side relation and exposed to charring heat. In a similar manner the inner surfaces of the corner elements 26 and end elements 28 will also be charred, appropriate precautions being taken to avoid damage to the edges of said elements which will form joints. Thereafter, the side walls and end walls of the inner shell 11 can be assembled into an arrangement such as that appearing in FIGURE 3, after which the bands 27 are tightly wrapped therearound to hold the assembled inner shell 11 in the desired position.

The segments 30, 31, 32 and 33 of the outer shell 13 are then assembled around the inner shell 11 and secured together by bands 46. Thereafter, the container 11 is ready for filling with newly distilled whiskey so that the aging process can commence.

When the aging process of the whiskey has been completed and the container 11 has been drained of its contents, the entire container assembly can be quickly disassembled merely by cutting the several bands 46 and 27. The segments of the outer shell 13 make no contact with the product of the container 11, so that they can immediately be reused on another container 11 for performing another aging operation.

The elements of the container 11 are dried properly and, thereafter, refinished as required on the inner and outer surfaces to provide, for example, flooring. Virtually all parts of the container 11 can be used in some manner. For example, even the corner members can be utilized by cutting off one flange thereof, thereby reducing to a negligible amount the loss which is presently total.

The parts of the containers 54 and 70 of the modified assemblies (FIGURE 7 and FIGURE 9) can be reused in precisely the same manner as discussed above with respect to the parts of the container 11. Likewise, the segments or side walls of the outer shells 55 and 72 can, as described above with respect to the outer shell 13, be reused in further aging operation. While the outer shell 55 is shown as constructed of wood, it will be recognized that it, as well as the outer shell 72, can be fabricated from light weight metal, plastic or the like.

Although particular preferred embodiments of the invention have been disclosed above for illustrative purposes, it will be understood that variations or modifications of such disclosure, which come within the scope of the appended claims are fully contemplated.

What is claimed is:

1. A container assembly for aging whiskey, said container being constructed so that the parts thereof can be reused after the aging is completed, comprising:

a plurality of flat, elongated and wooden side elements of substantially the same length, width and thickness, said elements having interengageable joint means along the lengthwise edges thereof;

four elongated corner elements of L-shaped cross section and having joint means along the lengthwise edges thereof similar to said joint means on said side elements, said side elements and said corner elements having transverse, aligned grooves in the inner sides thereof at two corresponding locations near the opposite ends thereof;

a plurality of end elements of substantially the same length and thickness arranged to form two end walls extending into the grooves at the opposite ends of said side and corner elements whereby said side and corner elements are positioned to form the four side walls of a rectangular container, said container being fabricated completely from white oak;

a plurality of bands extending around said side walls of said container transversely thereof to hold said walls together;

four substantially identical side members having a plurality of transverse ribs extending toward and engaging, respectively, the side walls of said container, said side members presenting a barrel-shaped external surface of circular cross section and of smaller diameter at both axial ends than at the center thereof, the minimum diameter of said external surface being greater than the maximum transverse dimension of said container; and a plurality of annular bands encircling said side members and tightly engaging said external surface whereby said transverse ribs are held tightly against the side walls of said container, and said side and corner elements are held in substantially liquid-tight engagement with each other and with said end walls.

2. The structure of claim 1 wherein each of said side members has a concave-convex outer shell and five parallel ribs extending radially inwardly so that the inner edges of said ribs define a plane; and wherein there are three annular bands each band being located radially outwardly of one of the three centermost ribs.

3. A liquid-tight container assembly for aging whiskey, said container assembly being constructed so that the parts thereof can be reused after the aging is completed, comprising:

a liquid-tight, rectangular container having four side walls and a pair of parallel end walls, each wall comprising a plurality of elongated, substantially flat and wooden elements having interengaging joint means along the lengthwise edges thereof, the elements in each wall being straight and of substantially uniform length and thickness, and each side wall having joint means interengaging with the adjacent side walls and the end walls to provide for liquid-tight engagement;

holding means engaging said side walls and holding said side walls against each other and against said end walls;

four rigid side members located adjacent the four side walls, respectively, each side member having holding means substantially disposed within a plane closely adjacent the outer surface of a side wall for holding said elements thereof against movement away from said end walls, each side member having a projecting portion thereon spaced from the lateral edges thereof and extending away from said plane a greater distance than the remainder of said member; and annular means tightly embracing said side members and said projecting portions thereof, whereby said container is held in said liquid-tight condition.

*4. A liquid-tight container assembly for aging whiskey, said container assembly being constructed so that the parts thereof can be reused after the aging is completed, comprising:*

*a liquid-tight, rectangular container having four side walls and a pair of parallel end walls, each wall comprising a plurality of elongated, substantially flat and wooden elements having interengaging joint means*

*along the lengthwise edges thereof, the elements in each wall being straight and of substantially uniform length and thickness, and each side wall having joint means interengaging with the adjacent side walls and the end walls to provide for liquid-tight engagement;*

*rigid side members located adjacent each of the four side walls on the outer side thereof, each side member having a substantially flat inner surface which firmly engages the outer surface of its associated side wall for holding the elements of its associated side wall against movement away from said end walls, the side members being of nonuniform thickness and the outer surfaces of said side members each including at least one projecting portion located at a greater distance from said inner surface than other portions thereof; and*

*a plurality of annular bands spaced apart lengthwise along said container and encircling said container, each of said bands tightly engaging at least the projecting portions on said side members which engage each of the four side walls of the container whereby*

*said side walls are held in assembled liquid-tight relationship with each other and with said end walls.*

*5. An assembly according to claim 4 wherein each said rigid side member comprises a plurality of spaced parts engaged by at least one band, each said part being of nonuniform thickness and including at least one outwardly projecting portion located at a greater distance from the inner surface thereof than other portions thereof.*

References Cited

The following references, cited by the Examiner, are of record in the patented file of this patent or the original patent.

UNITED STATES PATENTS

| | | | |
|---|---|---|---|
| 2,090 | 5/1841 | Sampson | 217—75 X |
| 2,045,859 | 6/1936 | Klein | 99—277.1 |
| 2,079,378 | 5/1937 | Mills | 99—277.1 |
| 2,135,622 | 11/1938 | Nagle | 99—277.1 |
| 3,021,780 | 5/1962 | Bobbe | 99—277.1 |

WILLIAM I. PRICE, *Primary Examiner.*